United States Patent [19]

Swinkels et al.

[11] 4,097,271
[45] Jun. 27, 1978

[54] HYDROMETALLURGICAL PROCESS FOR RECOVERING COPPER AND OTHER METAL VALUES FROM METAL SULPHIDES

[75] Inventors: Godefridus M. Swinkels, Rossland; Edward F. G. Milner, Warfield; Roman Michael Genik-Sas-Berezowsky, Edmonton, all of Canada

[73] Assignees: Cominco Ltd., Vancouver; Sherritt Gordon Mines Limited, Toronto, both of Canada

[21] Appl. No.: 741,280

[22] Filed: Nov. 12, 1976

[30] Foreign Application Priority Data

Dec. 11, 1975 Canada .................................. 241806

[51] Int. Cl.$^2$ ...................... C22B 15/08; C22B 11/04
[52] U.S. Cl. .................................. 75/104; 75/101 BE; 75/108; 75/117; 75/118 R; 75/120; 204/98; 423/34; 423/42; 423/100; 423/604
[58] Field of Search ............... 75/104, 72, 108, 118 R, 75/117, 120, 101 BE; 423/42, 34, 604, 100; 204/98

[56] References Cited

U.S. PATENT DOCUMENTS

| | | | |
|---|---|---|---|
| 629,856 | 8/1899 | Hoepfner ........................... 75/104 X |
| 738,007 | 4/1903 | Dawson ............................. 75/72 X |
| 1,736,659 | 11/1929 | Mitchell ........................... 75/104 X |
| 2,384,361 | 9/1945 | Amos ................................... 423/42 |
| 2,662,009 | 12/1953 | Roberts et al. ................... 75/120 X |
| 3,194,652 | 7/1965 | Clifford et al. ................ 75/101 BE |
| 3,441,372 | 4/1969 | Pegler et al. ..................... 75/120 X |
| 3,669,650 | 6/1972 | Elstein et al. .................... 75/117 X |
| 3,785,944 | 1/1974 | Atwood et al. ................... 75/104 X |
| 3,972,711 | 8/1976 | Goens ............................... 75/104 X |

Primary Examiner—G. Ozaki
Attorney, Agent, or Firm—Arne I. Fors

[57] ABSTRACT

A hydrometallurgical process for the separate recovery of non-ferrous, ferrous, and precious metal values and sulfur from metal sulfide ore concentrates by leaching of metal sulfides with a lixiviant containing ferric chloride, cupric chloride and chlorine, precipitating cuprous chloride from the leach solution with butadiene, separating and decomposing the formed addition compound to recover the cuprous chloride, oxidizing and hydrolyzing the cuprous chloride to precipitate cupric oxychloride, converting the cupric oxychloride to cupric oxide, and reducing the cupric oxide with hydrogen for the recovery of copper. The leach residue is treated for the recovery of elemental sulfur and gold. Brine solution resulting from the conversion of cupric oxychloride to cupric oxide is electrolyzed for the production of sodium hydroxide for the cupric oxychloride conversion, hydrogen for the cupric oxide reduction and chlorine, which is partly used in the recovery of gold and partly recycled to the concentrate leach. Silver is recovered as silver iodide from the mother liquor from the cuprous chloride precipitation with butadiene. A portion of the solution from the silver recovery is treated for recovery of Cu, Zn, Co and Ni, and the remaining portion and residual solution from Cu, Zn, Co and Ni recovery are treated with oxygen at elevated temperature and pressure for the regeneration of ferric chloride and precipitation of excess iron as anhydrous ferric oxide.

19 Claims, 2 Drawing Figures

HYDROMETALLURGICAL PROCESS FOR RECOVERING COPPER AND OTHER METAL VALUES FROM METAL SULPHIDES

BACKGROUND OF THE INVENTION

This invention relates to improvements in the recovery of copper values from copper-bearing materials and, more particularly, to improvements in a hydrometallurgical process for the separate recovery of non-ferrous, ferrous, and precious metal values and sulphur from metal sulphide ore concentrates using a chloride lixiviant.

Many processes are known for the hydrometallurgical extraction of non-ferrous, ferrous and precious metals and sulphur from metal sulphide materials with chloride containing lixiviants. These processes usually comprise leaching ores or concentrates with boiling ferrous, ferric and cupric chloride lixiviant to form copper chlorides and elemental sulphur followed by the recovery of copper from the leach solution by cementation or electrolysis or by precipitation as copper sulphides followed by pyrometallurgical process steps. Elemental sulphur may be distilled or extracted from the leach residue. The final solution may be electrolyzed for recovery of iron and regeneration of lixiviant. Major disadvantages of these processes, in the recovery and purification of the copper metal, are the requirements for costly electro-refining and/or electrowinning processes and the loss of precious and other metal values.

According to Canadian Pat. No. 938,793, which issued on Dec. 25, 1973, these disadvantages have been partly overcome. The patent discloses a process for recovering copper values from copper-bearing material which comprises the steps of leaching the material with a ferric chloride containing lixiviant, reducing the cupric ions in the leach solution with copper, crystallizing the cuprous chloride, treating the cuprous chloride with hydrogen to recover elemental copper and treating the ferrous chloride with hydrochloric acid and oxygen to regenerate the ferric chloride lixiviant and to simultaneously precipitate ferric oxide. This process, however, has a number of disadvantages. The crystallization of cuprous chloride from the reduced leach solution is limited by the solubilities of the components of the solution and consequently results in a limited yield of cuprous chloride. The reduction of cuprous chloride with hydrogen has thermodynamic limitations which makes application on a large scale difficult. Zinc and precious metals are not separately recoverable, i.e., silver is partly cemented in the reduction with metallic copper and partly co-crystallized with the cuprous chloride, gold leaves the process in the leach residue and zinc is recovered as zinc oxide in a mixture of oxides of iron, magnesium, calcium and zinc.

We have now discovered that the above-mentioned disadvantages can be alleviated by the process of the present invention. It is, therefore, an important object of our invention to provide an improved process for producing copper from copper-bearing materials using a chloride containing lixiviant.

It is another object of our invention to provide a process for producing cuprous chloride in a high yield and for efficiently reducing this cuprous chloride to metallic copper.

It is a further object of our invention to provide a process for the separate recovery of ferrous, non-ferrous and precious metal values and elemental sulphur from ore concentrates containing metal sulphides.

These and other objects and the manner by which they can be attained will become clear from the following description of the process of the invention.

STATEMENT OF INVENTION

According to one embodiment of the invention there is provided an improved process for the recovery of copper from concentrates containing metal sulphides which comprises the steps of leaching said metal sulphides with lixiviant containing ferric chloride, cupric chloride and chlorine, separating the leach solution from the leach residue, precipitating cuprous chloride in the leach solution with gaseous butadiene, separating the formed addition compound of cuprous chloride and butadiene from the solution, treating said solution with oxygen for regeneration of the ferric chloride in the lixiviant with simultaneous precipitation of ferric oxide, decomposing said addition compound to recover the cuprous chloride, oxidizing and hydrolyzing the cuprous chloride to precipitate cupric oxychloride, converting the cupric oxychloride to cupric oxide and reducing the cupric oxide with hydrogen for the recovery of copper.

According to a second embodiment of the invention, there is provided an improved process for the separate recovery of ferrous, non-ferrous and precious metals, and elemental sulphur from metal sulphide ore concentrates which may be broadly described as follows. Ground ores and concentrates of metal sulphides are leached at elevated temperature with lixiviant containing ferric chloride, cupric chloride and absorbed chlorine. The leach residue is treated for the recovery of elemental sulphur and of a solution containing gold by leaching with a solution containing ferric chloride and chlorine in predetermined concentrations, leaving a final residue containing molybdenum sulphide and/or pyrite, depending on the composition of the initial concentrate. The former leach solution is treated with cement copper obtained from a subsequent process step for the reduction of at least a portion of the cupric chloride in the solution to cuprous chloride. The resulting solution is treated with gaseous butadiene at reduced temperature for precipitation of cuprous chloride as a cuprous chloride butadiene addition compound and for substantially complete separation of copper from silver, zinc, iron, cobalt, nickel and other minor metals. The precipitated addition compound is separated from the mother liquor and decomposed at elevated temperature and/or reduced pressure whereby butadiene is recovered for recycling and a pure solid cuprous chloride is obtained. The solid cuprous chloride is slurried with an aqueous solution and subjected to oxidation and hydrolysis at elevated temperature and pressure to form cupric oxychloride. The precipitated cupric oxychloride is separated from the solution, which is returned to the leach. The cupric oxychloride is converted to cupric oxide with a sodium hydroxide solution and, after separation from the resulting brine solution, the cupric oxide is reduced in the solid state with hydrogen at elevated temperature to metallic copper. The resulting brine solution is electrolyzed for the production of sodium hydroxide solution for the cupric oxychloride conversion, hydrogen for the cupric oxide reduction and chlorine which is partly used in the leaching of the gold containing leach residue and partly absorbed in a small portion of leach solution which is returned to the concentrate leach. The mother liquor from the cuprous chloride precipitation with butadiene is treated with cuprous iodide for the recovery of silver as silver iodide. A major portion of the residual solution from the silver recovery is treated in a regeneration step with oxygen at elevated temperature and pressure for the regeneration of ferric chloride containing lixiviant and simultaneous precipitation of excess iron as ferric oxide. Regenerated lixiviant is returned to the leach and the ferric oxide is recovered. The remaining portion of the residual solution is treated for recovery of copper, zinc, cobalt and nickel. First, the solution is treated with iron for cementation of its copper content, the resulting copper cement is utilized in the reduction of cupric chloride in the leach solution. Then, the zinc is extracted with a solvent, which is subsequently stripped from the extract and recycled while the zinc is precipitated as zinc carbonate with a carbonated brine solution and recovered. The solution is subsequently treated with hydrogen sulphide for the precipitation of nickel and cobalt as sulphides which are recovered. A portion of the remaining solution is purged to maintain a balance of alkali and earth alkali metals in the process while the remainder is fed to the regeneration step.

BRIEF DESCRIPTION OF THE DRAWINGS

The process will now be described with reference to the accompanying figures which are flowsheets schematically illustrating the steps of the process.

DESCRIPTION OF THE PREFERRED EMBODIMENT

Ores and concentrates suitable for treatment for recovery of copper and other metal values may comprise copper sulphides, copper-iron sulphides, iron sulphides, sulphides of zinc, cobalt, nickel, lead and molybdenum, precious metals such as gold and silver, as well as small amounts of bismuth, arsenic, antimony, selenium, tellurium and tin.

The ores and concentrates should be in finely divided form and may be subjected to size reduction if desired. A fineness whereby 98% of the ground material passes a 325 mesh screen (Tyler) is satisfactory.

Figure 1:
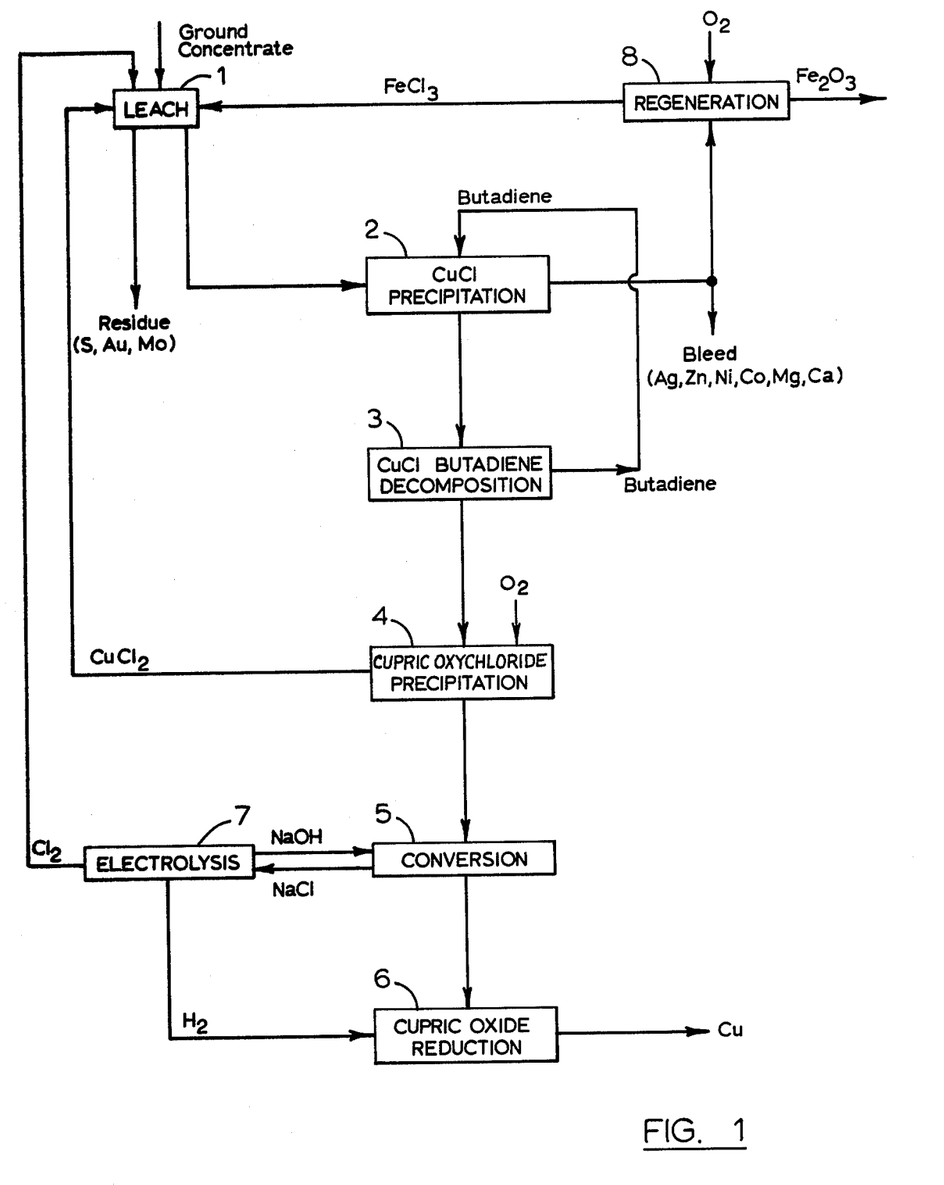
FIG. 1 represents the flowsheet which illustrates the process for the recovery of copper from concentrates containing metal sulphides.

With reference first to FIG. 1, finely divided ores and concentrates are fed to a leach 1 wherein they are contacted with lixiviant containing ferric chloride, cupric chloride and chlorine at elevated temperature to solubilize copper and iron. The main reactions which occur are illustrated for chalcopyrite in equations (1), (2) and (3).

$$2CuFeS_2 + 7FeCl_3 \rightarrow CuCl + CuCl_2 + 9FeCl_2 + 4S \quad (1)$$

$$CuFeS_2 + 3CuCl_2 \rightarrow 4CuCl + FeCl_2 + 2S \quad (2)$$

$$CuFeS_2 + 3CuCl_2 + 4Cl^- \rightarrow 4CuCl_2^- + FeCl_2 + 2S \quad (3)$$

The chlorine has an oxidizing action which causes some of the cuprous chloride to form an anion complex and causes some reoxidation of ferrous to ferric chloride. A side reaction which occurs between cupric chloride and the formed elemental sulphur is responsible for the formation of some sulphate in the leach solution. This sulphate, however, reacts with calcium dissolved in the leach to form calcium sulphate which precipitates and is removed with the leach residue.

The leach solution comprises cuprous chloride, cupric chloride, ferrous chloride and dissolved values of other metals such as silver, zinc, nickel, cobalt, bismuth, lead, tin, selenium and tellurium, and magnesium, calcium and the alkali metals from feed gangue. The leach residue comprises at least one of gold, sulphur, pyrite, molybdenite, gypsum and residual gangue.

The lixiviant may comprise from about 50 to 200 g/l iron as ferric chloride, up to about 80 g/l copper as cupric chloride and from about 5 to 50 g/l chlorine. The ferric chloride and cupric chloride in the lixiviant may be added as separate or combined solutions. The chlorine may be added to the leach as required, either separately or absorbed in lixiviant. The lixiviant may also contain some ferrous chloride, the amount depending on the nature of the material being leached and on considerations for obtaining optimum conditions in the process.

The leach is conducted at a temperature in the range of from about 80° to 110° C. under autogenous pressure and preferably at a temperature in the range of from 95° C. to the boiling point of the reaction mixture at atmospheric pressure. The retention time of the reaction mixture in the leach may be typically from about 2 to 5 hours at about 95° C.

We have found that it is advantageous to add the chlorine to the leach separately from the ferric and cupric chloride-containing solutions and about one hour after commencement of the leach. The addition of chlorine at some time after commencement of the leach enables the cupric chloride to react ahead of reaction by chlorine. Preferably, the leach is commenced and continued for a first period of time, the desired amount of chlorine is added over a second period and the leach is continued for a third period of time.

The leach may be exemplified by the following example. 160 g. of a typical copper concentrate, analyzing 25.7% copper, 27.9% iron and 28.9% total sulphur was ground to a fineness whereby 98% passed a 325 mesh screen (Tyler). The ground concentrate was leached with 1 l. lixiviant containing 76.4 g/l Fe$^{+++}$, 61.1 g/l Cu$^{++}$, 20.5 g/l Mg$^{++}$, 17.1 g/l Zn$^{++}$ and 17.6 g/l HCl at a temperature of 107° C. under autogenous pressure for an initial period of 60 minutes. Then chlorine gas was added in an amount of 12.2 g. over a period of 20 minutes and the leach was continued for a further 180 minutes. After completion of the leach the reaction mixture was filtered. The solids leach residue analyzed 2.6% copper, 9.9% iron, 73.2% total sulphur and 61.0% elemental sulphur. The leach solution analyzed 91.2 g/l Cu$^+$, 7.4 g/l Cu$^{++}$ and 115.3 g/l Fe$^{++}$. The extraction of copper from the concentrate was 96.3%, of iron 87.0%, of elemental sulphur 78.5% while 5.9% of the sulphur was converted to sulphate. The ratio of cuprous to total copper in the leach solution was 0.92.

The leach may preferably be performed in countercurrent fashion in one or more stages.

The leach solution from leach 1 is separated from the leach residue in a liquid-solids separation step. Liquid-solids separations in the process (not shown) are carried out using conventional methods such as, for example, settling, filtration or centrifuging.

The leach solution is fed to cuprous chloride precipitation 2 where the said leach solution is contacted with gaseous 1-3 butadiene for precipitation of a solid, insoluble addition compound of cuprous chloride-butadiene according to the reversible reaction represented by equation (4).

$$2 CuCl + C_4H_6 \rightleftarrows 2 CuCl \cdot C_4H_6 \qquad (4)$$

The contacting of the leach solution with the gaseous 1-3 butadiene may be carried out batchwise or continuously in a closed vessel, preferably in a non-oxidizing atmosphere, ie. in the absence of air or other oxidizing gas. Butadiene is fed to the vessel under a slight overpressure and is, for example, sparged into the solution which is continuously agitated to ensure good liquid-gas contact.

The leach solution, which may contain up to 100 g/l total copper of which up to 95 g/l may be in the cuprous state, is cooled during or prior to contacting with the butadiene. The temperature of the reaction mixture in the vessel is maintained in the range of from about $-35°$ to $+40°$ C. and preferably in the range of from about $-5°$ to $+25°$ C. The contact time depends on the temperature and is usually between 5 and 180 minutes. Pressure is autogenous pressure. The content of cuprous copper in the leach solution may be reduced to 5 g/l in the mother liquor, ie. residual solution, resulting from the precipitation.

Cuprous chloride is selectively precipitated and can be separated from cupric copper and all other metals in the leach solution except silver. Silver chloride may also form an addition compound with butadiene depending on the concentration of copper in the mother liquor. If the concentration of cuprous copper is maintained above 20 g/l, the silver chloride will not precipitate, while if maintained below this concentration, at least a portion will co-precipitate with the cuprous chloride.

Upon completion of the precipitation, the reaction mixture is subjected to a liquid-solids separation to obtain the solid addition compound and the mother liquor. The former is fed to decomposition 3 and the latter to regeneration 8, to be described.

In decomposition 3, the addition compound is decomposed according to the reversible reaction shown in equation (4). The addition compound is slurried with water or an acidic solution and decomposed by either raising the temperature to a value of up to about 80° C. at atmospheric pressure or by reducing the pressure below atmospheric pressure. Preferably, the decomposition is carried out at a temperature in the range of from about 40° to 65° C. and under a reduced pressure in the range of from about 0.01 to 0.9 atmosphere absolute.

The decomposition is carried out in a closed vessel in the absence of oxidizing gases, its contents being agitated. Towards the end of the decomposition period, the contents may be purged with an inert gas such as, for example, nitrogen. The butadiene evolved during decomposition is returned to precipitation 2.

The precipitation of cuprous chloride as its butadiene addition compound and the decomposition of the addition compound are exemplified by the following example. 6 liters of a leach solution obtained from leach 1, containing 87 g/l $Cu^+$, was contacted with gaseous 1-3 butadiene fed under slight pressure in a closed vessel in absence of air. The contents of the vessel were agitated and the temperature was maintained at 11° C. The reaction was continued until the copper content of the solution reached about 5 g/l. The reaction mixture was filtered and the solids were decomposed at a temperature of 60° C. in a vacuum oven. The mother liquor from the filtration measured 6 l. and contained 5.6 g/l $Cu^+$. 780 g. of decomposed solids were obtained which contained 488 g. copper.

The solid cuprous chloride is treated in precipitation 4. In precipitation 4, the cuprous chloride is subjected to oxidation and hydrolysis whereby a precipitate of basic copper chloride and a solution of cupric chloride are formed. The basic copper chloride is in the form of a copper oxychloride approximating the stoichiometry of para-atacamite and is herein referred to as cupric oxychloride. The cupric oxychloride is formed according to a reaction represented by reaction equation (5).

$$6CuCl + 1.1/2\ O_2 + 3H_2O \rightarrow CuCl_2 \cdot 3Cu(OH)_2 + 2CuCl_2 \qquad (5)$$

Cuprous chloride is slurried with water and treated with an oxygen-bearing gas in a closed agitated reaction vessel. The oxydrolysis can be carried out at temperatures of above 50° C. but, in order to obtain a precipitate with suitable settling and filtration characteristics, it is necessary to conduct the reaction at temperatures above 100° C. Consequently, the oxydrolysis is carried out at temperatures in the range of from about 50 to 150° C, preferably from about 100° to 150° C. The oxygen-bearing gas may be air or oxygen or mixtures thereof. The pressure in the reaction vessel may be maintained in the range of from atmospheric to about 250 psi. Preferably a partial pressure of oxygen in the range of from about 40 to 100 psi is maintained. To further improve the characteristics of the precipitate, the reaction mixture may be seeded with precipitate obtained earlier. Any silver which has been precipitated in cuprous chloride precipitation 2 is solubilized in cupric oxychloride precipitation 4.

The precipitation of cupric oxychloride is typified by the following example. A 4 l. autoclave was charged with 452 g. powdered cuprous chloride, 100 g. cupric oxychloride from a previous precipitation and 2 l. of a solution containing 198 g. cupric chloride. The autoclave contents were agitated and heated to 102° C. Oxygen was added at a rate of 0.47 l/min. The pressure in the autoclave ranged from atmospheric at the beginning to 45 psig at the end of the test. After 1 hour the contents of the autoclave were cooled to 50° C., discharged and filtered. The solids filtered well, weighed 402 g. dried, and analyzed 58.9% Cu and 17.1% chloride. The final solution has a volume of 2 l. and analyzed 103 g/l copper and 114 g/l chloride; no cuprous copper was detected. The copper and chloride contents of the solids corresponded to those of cupric oxychloride.

The reaction mixture from precipitation 4 is discharged from the reaction vessel and subjected to a liquid-solids separation. The solution which mainly contains cupric chloride is returned to leach 1 and the solids are fed to conversion 5.

In conversion 5, the solids are treated with a hot sodium hydroxide solution to convert the cupric oxychloride to cupric oxide and brine according to equation (6).

$$CuCl_2 \cdot 3Cu(OH)_2 + 2NaOH \rightarrow 4CuO + 2NaCl + 4H_2O \qquad (6)$$

The cupric oxychloride is mixed with an approximately stoichiometric amount of an aqueous solution of sodium hydroxide and is heated in a suitable vessel to a temperature in the range of from about 80° C. to the boiling point of the mixture, preferably to about 95° C. The reaction is conducted under atmospheric or autogenous pressure and is complete in thirty minutes or less. Sodium hydroxide is added to give a final pH in the mixture in the range of from 7 to 11, preferably between 8 to 9. Conversion is incomplete at low pH levels, resulting in production of a copper oxide-containing chloride. At high pH levels copper is solubilized and a gelatinous oxide is formed making liquid-solid separation and washing difficult.

The conversion of cupric oxychloride to cupric oxide is exemplified as follows: 100 g. of precipitate obtained in the conversion of cupric chloride to cupric oxychloride, containing 58.9% copper and 17.1% chloride, is mixed with 1 l. of a 0.5 M. (molar) solution of sodium hydroxide. The mixture is boiled for twenty minutes. The resulting reaction mixture is filtered and the solids dried. 73.5 g. cupric oxide is obtained. The residual brine contains sodium chloride and the excess sodium hydroxide.

The formed cupric oxide is separated from the brine by liquid-solids separation and is subjected to treatment with hydrogen in reduction 6 for reduction to metallic copper. This reduction is conveniently carried out in converter at temperatures above the melting point of copper. A simple lancing with hydrogen removes the oxygen.

It will be understood that the steps 4, 5 and 6 may be carried out alternatively by direct conversion of cuprous chloride to cuprous oxide and subsequent reduction with hydrogen to metallic copper. This alternative, however, has the disadvantages of generating three times as much brine, which must be treated to avoid pollution, and possible loss of silver with the cuprous oxide.

The brine is fed to electrolysis 7 wherein the sodium hydroxide solution is regenerated for use in conversion 5 and wherein hydrogen and chlorine are evolved. The hydrogen is utilized in reduction 6 and the chlorine is fed to leach 1. The electrolysis is carried out using the method and apparatus as used in conventional chloralkali plants. Removal of unconverted sodium chloride from chloralkali cell discharge is not required since it does not hinder copper oxide conversion.

The mother liquor obtained from the precipitation of cuprous chloride is fed to regeneration 8. The mother liquor contains copper and silver not precipitated in precipitation 2, as well as all the zinc, cobalt and nickel which were present in the concentrate being treated and impurities such as calcium, magnesium and alkali metals. To maintain the concentration of zinc, cobalt, nickel and the impurities at a permissible level, it is necessary to bleed off a small portion of the liquor. The bleed solution may subsequently be treated for recovery of values.

The mother liquor, after removing the required amount of bleed solution, is treated in regeneration 8 to regenerate ferric chloride containing lixiviant and, simultaneously, to separate the portion of iron present in the solution which is in excess of the amount required in the lixiviant. The solution is treated in one or more reaction vessels with an oxygen-bearing gas. The ferrous chloride is oxidized to ferric chloride, which is partly hydrolyzed to ferric oxide according to the reaction represented by equation (7). Any cuprous chloride will be oxidized by ferric chloride to cupric chloride.

$$6 FeCl_2 + 1.1/2 O_2 \rightarrow 4 FeCl_3 + Fe_2O_3 \qquad (7)$$

The reaction is carried out at temperatures in the range of from about 135° to 165° C. in order to obtain filterable precipitates of substantially anhydrous ferric oxide. Below about 135° C. the precipitated iron product is a hydrated ferric oxide which is difficult to settle, filter and wash, while above about 165° C. another reaction occurs which results in the formation of an undesirable amount of hydrochloric acid. In the preferred temperature range the small amount of hydrochloric acid which forms will mainly remain dissolved in the lixiviant. The oxygen in the reaction vessels is maintained at a partial pressure in the range of from about 100 to 200 psi.

Depending on the temperature, filterable precipitates are obtained with retention times of from about 10 to 120 minutes. At 160° C. and 200 psi partial pressure oxygen the regeneration and precipitation are essentially completed within 30 minutes.

The ferric oxide precipitated will be the amount required to maintain the correct balance of iron in the process, provided the chloride losses are replaced. Such losses are made up by feeding chlorine from electrolysis 7 to leach 1 and, if so desired, to regeneration 8.

The ferrous ion content in the solution fed to the regeneration step can be as high as the solubility of ferrous chloride will permit. We have found that the solution may contain as high as 300 g/l iron as ferrous chloride.

The precipitated ferric oxide is separated from the liquid by liquid-solids separation, washed, dried and removed from the process. The product is suitable for reduction to iron. The liquid is returned as lixiviant to leach 1.

The regeneration is typified by the following example. 2.1 l. of a mother liquor from the precipitation of cuprous chloride with butadiene was charged to a 4 l. autoclave. The solution analyzed 34.3 g/l $Cu^+$, 9.6 g/l $Cu^{++}$, 112 g/l $Fe^{++}$ and 37.3 g/l HCl. The autoclave contents were purged with oxygen, heated to 160° C. and oxygen was admitted to a pressure of 200 psig, which pressure was maintained during the test. Samples of reaction mixture were withdrawn after 3, 5, 10 and 60 minutes retention time and analyzed. The results are shown in Table 1.

Table 1

| Sample No. | 1 | 2 | 3 | 4 |
|---|---|---|---|---|
| Retention Time in Min. | 3 | 5 | 10 | 60 |
| Analysis in g/l | | | | |
| $Cu^+$ | 2.0 | 0 | 0 | 0 |
| $Cu^{++}$ | 45.0 | 46.0 | 47.5 | 46.1 |
| $Fe^{++}$ | 10.0 | 2.0 | 0 | 0 |
| $Fe^{+++}$ | 92.0 | 87.0 | 84.0 | 82.0 |
| Fe in solids | 10.0 | 23.0 | 28.0 | 30.0 |

After 60 minutes the autoclave contents were cooled to 70° C. and discharged. The solids in the reaction mixture settled rapidly and filtered well. The solids were dried and were found to contain 0.14% copper and 56.0% iron. The iron was present as $Fe_2O_3$.

Figure 2:
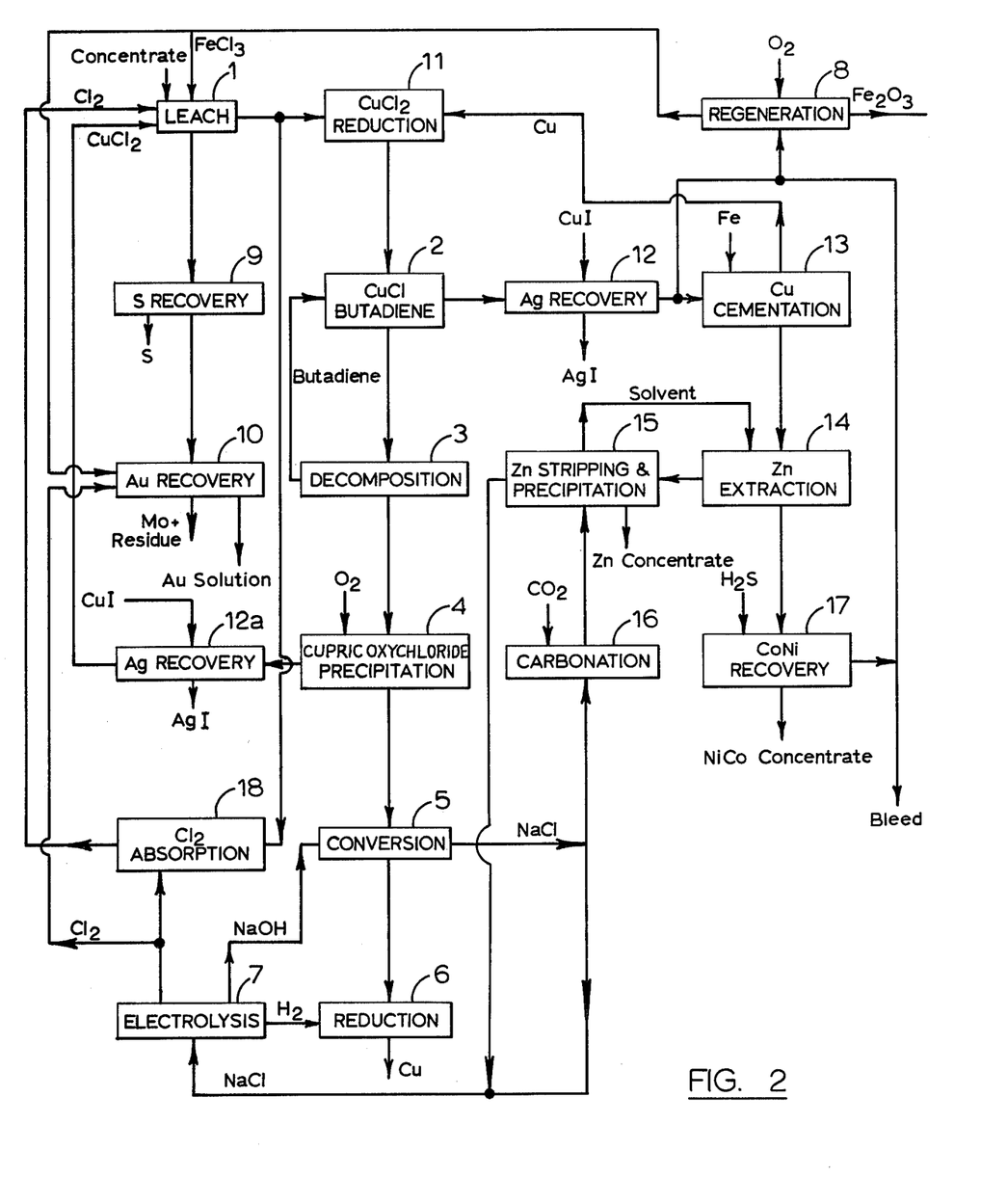
FIG. 2 represents the flowsheet which illustrates the process for the separate recovery of ferrous, non-ferrous and precious metals, and elemental sulphur from metal sulphide ore concentrates.

With reference now to FIG. 2, the process represented by this flowsheet shows the common steps indicated in FIG. 1, using identical numbering, as well as additional steps which provide for the recovery of values other than of copper and iron. The process according to this flowsheet is a closed, integrated process for the recovery of non-ferrous, ferrous and precious metals, and sulphur from ore concentrates containing metal sulphides.

The leach 1 is carried out as described with reference to FIG. 1. The solids residue obtained from the leach contains sulphur in elemental form and pyrite, gold, molybdenum and gangue materials.

The solids residue is treated in sulphur recovery 9. The recovery of sulphur may be carried out by one of a number of known methods, such as pelletization, hot filtration, solvent extraction and distillation. The preferred method is to heat the solids residue above the melting point of sulphur and to filter off the molten sulphur, which is subsequently solidified in a desired physical form such as prills, granules, flakes or blocks. About 75 to 90% of the elemental sulphur formed in leach 1 is recovered in this stage. The remaining solids residue after removal of the major portion of the elemental sulphur is fed to gold recovery 10.

In gold recovery 10, the remaining solids residue is leached with a ferric chloride solution and dissolved chlorine gas. The most important variable in this leach is the oxidation potential of the solution.

We have found that in order to leach gold from the residue, the oxidation potential of the reaction mixture should be maintained at values above at least about 550 millivolt (mv) as measured versus a saturated calomel electrode. Below about 550 mv, gold will not dissolve or, if in solution, will cement out. At values of the oxidation potential above about 930 mv, as measured versus a saturated calomel electrode, sulphur chloride may be formed. The oxidation potential of the reaction mixture, therefore, is maintained at values in the range of from about 550 to 930 mv, preferably of from about 560 to 900 mv. The oxidation potential can be controlled within the preferred range by maintaining an amount of chlorine in the reaction mixture in a weight ratio of chlorine to dissolved gold of from about 1:1 to 1:6. The ferric chloride solution may be obtained from regeneration 8 and may contain from about 50 to 200 g/l iron as ferric chloride. The leach is carried out at elevated temperature in the range of from about 50° to 90° C., with retention times of from about 2 to 24 hours and a solids content in the reaction mixture of from 150 to 500 g/l, preferably from about 150 to 200 g/l. Up to 95% of the gold may be extracted.

Residue from sulphur recovery 9 is mixed with ferric chloride solution in a suitable vessel and heated to the desired temperature. Chlorine gas is sparged in the solution at a controlled rate and the potential of the reaction mixture monitored. The solution potential is maintained at the desired value by regulating the amount of chlorine gas fed.

After the leach is completed the reaction mixture is subjected to a liquid-solids separation. The liquid which contains gold and iron in solution may be treated for recovery of gold, residual solution being returned to leach 1. The solids which contain molybdenite and gangue materials may be treated for the recovery of molybdenum.

The extraction of gold from the solids residue from the leach after sulphur removal may be exemplified as follows. 150 g. desulphurized solids containing 6.9 mg. gold were slurried in one l. of a solution containing 200 g/l $Fe^{+++}$. The slurry was heated to 90° C. and chlorine gas was sparged in the slurry at a rate of 12 ml/min. for 120 minutes over a period of 3 hours and 45 minutes. At this rate, the measured oxidation potential of the solution was maintained at 760 mv. The slurry was filtered and the solution contained 5.3 mg/l. gold. The residue was again slurried with one l. of solution containing 200 g/l $Fe^{+++}$. The slurry was heated to 62° C. and chlorine gas was sparged at a rate of 15 ml/min. for 150 minutes over a period of 210 minutes. The slurry was filtered and the solution contained 1.0 mg/l gold. The total amount of gold extracted from the residue was 91.5%.

Alternatively to the leaching of the solids residue for the recovery of gold, the residue may be treated with sodium cyanide and oxygen in aqueous medium while controlling the pH with additions of lime. Cyaniding will also extract up to 90% of the gold in the solids residue.

The leach solution from leach 1 is treated with metallic copper, such as cement copper, in a reduction 11, wherein at least a portion of copper present as cupric ions is reduced to the cuprous state. The reduction is performed at a temperature in the range of from about 80° C. to the boiling point of the solution. The amount of cement copper added to the reduction may vary and depends on the amount produced in a subsequent process step, to be described.

The reduced leach solution from reduction 11 is subsequently treated for the recovery of copper by the process as described above with reference to the flowsheet represented by FIG. 1, i.e. steps 2 through 6.

The solutions obtained in the liquid-solids separations which follow steps 2 and 4, i.e. the cuprous chloride and cupric oxychloride precipitations respectively, are treated for the recovery of their silver content in silver recovery steps 12 and 12a. Silver present in the ores and concentrates is dissolved in leach 1 and is present as silver chloride in the leach solution. Depending on the concentration of cuprous chloride in the mother liquor in precipitation 2, as discussed hereinabove, the silver will either remain in solution or co-precipitate with the cuprous chloride. The silver which remains in the mother liquor must be recovered prior to regeneration of lixiviant where considerable losses could occur. Silver that is precipitated in step 2 as the silver chloride-butadiene addition compound, which is decomposed in step 3, goes into solution in the precipitation of cupric oxychloride in precipitation 4 and accompanies the cupric chloride-containing solution which is returned to leach 1.

The silver is preferably removed from solution in recoveries 12 and 12a as silver iodide. Because silver chloride forms complex ions with chloride ions in the solution, it is not feasible to obtain a proper separation of silver as silver chloride. Silver iodide is highly insoluble and a good separation from the solution is obtained. The silver iodide is preferably precipitated with cuprous iodide, potassium iodide being unsuitable as it releases free iodide. (Silver iodide is several orders of magnitude more insoluble than cuprous iodide).

Cuprous iodide is added to the silver-containing solution in an amount of from about 2 to 10 times, preferably 2 to 5 times, the stoichiometric requirement for the precipitation of silver iodide. The solution is preferably maintained under a non-oxidizing atmosphere and the reaction is carried out at a temperature in the range of from about 10° to 70° C., preferably 10° to 25° C. The retention time may be from about 10 to 120 minutes in which range the removal of silver is about 90% complete. The removal of silver is more complete in solutions having a low concentration of cuprous ions. Precipitated silver iodide is recovered from the solution and may be treated for the production of silver metal.

The effective removal of silver from mother liquor from the precipitation of cuprous chloride with butadiene and from solution from the cupric oxychloride precipitation is typified by the following example. The analysis of the solutions is shown in Table II.

Table II

| Solution | Metal Concentration in g/l | | | | Silver Concentration in mg/l. |
|---|---|---|---|---|---|
| No. | $Cu^+$ | $Cu^{++}$ | $Fe^{++}$ | $Cl^-$ | Ag |
| 1 | 0 | 190 | 0 | 2 | 57 |
| 2 | 5.6 | 5.5 | 103 | 220 | 24 |

To 0.5 l. of solution No. 1 was added ten times the stoichiometrically required amount of cuprous iodide. The solution was heated at 60° C. for 10 minutes and allowed to cool to 20° C. The precipitate was filtered off and the residual solution was found to contain 1.5 mg/l silver, i.e. 97% recovery of silver in the residue.

One l. of solution No. 2 was split in two equal portions which were cooled to 10° C. To the portions was added 2 and 5 times the stoichiometric amount of cuprous iodide respectively and the change in the silver concentration in the solution was determined with time. The results are shown in Table III.

Table III

| time - min. | Concentration of silver in mg/l | |
|---|---|---|
| | 2× stoich. CuI | 5× stoich. CuI |
| 0 | 24.0 | 24.0 |
| 15 | — | 6.2 |
| 30 | 15.5 | 6.2 |
| 60 | 11.5 | 4.0 |
| 120 | 6.8 | 1.0 |

The solution after silver recovery step 12a is returned to leach 1. The solution after silver recovery step 12 is split in 2 portions. A major portion of the solution is fed to regeneration 8 for regeneration of lixiviant containing ferric chloride and simultaneous precipitation of ferric oxide as described above with reference to FIG. 1. A minor portion is treated for the recovery of copper, zinc, nickel and cobalt. The amount of the minor portion is determined by the content of zinc, nickel and cobalt in the concentrate. The exact amount is chosen so that all named metals may be recovered by suitable treatment of the solution.

The solution is first treated for removal of copper, which is incidentally present. Copper is removed in cementation 13 with iron. The cementation may be accomplished according to well established methods. The quantity of iron consumed in the cementation is between about 200 and 500 g. iron per 500 g. of copper cemented. The metallic copper which is recovered from the cementation 13 is used in reduction 11 wherein cupric ions are reduced to the cuprous state.

The residual solution from cementation 13 is substantially free of copper, i.e. it contains less than 0.1 g/l copper. This solution is treated for the recovery of zinc.

All zinc in the concentrates being treated is solubilized in leach 1 as complex zinc chloride ions. An amount of up to about 20 g/l of dissolved zinc is allowed in the process circuit but the quantity in excess of this amount must be removed.

Because of the high iron concentration in the solution zinc cannot be precipitated as its sulphide without also precipitating iron compounds. We have found that zinc may be efficiently removed from the solution by solvent extraction followed by stripping the zinc from the solvent and precipitation as carbonate and/or hydroxide.

The solution from cementation 13 is contacted with a suitable solvent in zinc extraction 14. Suitable solvents are tertiary amines and tributyl phosphates. One suitable tertiary amine which gave selective extraction of the zinc from the solution was tri-iso-octyl amine chloride diluted with benzene. Concentrations of from about 0.1 to 0.6 molar of the solvent in benzene provided effective extraction of the zinc. Emulsification in the extraction step may be controlled by the addition of a small amount of a higher alcohol, such as, for example, octanol or dodecanol. The extraction is preferably carried out at a temperature in the range of from about ambient temperature to 30° C. and at a pH in the range of from about 0.5 to 1.5.

In extraction 14, the solution from cementation 13 is thoroughly mixed with the diluted solvent and then settled for the separation in the extract and raffinate phases. The extraction is usually performed counter-or cross-currently in up to 5 stages. The raffinate which contains only about 0.5 g/l zinc is further treated for recovery of nickel and cobalt.

The extract which may contain from about 10 to 20 g/l zinc is treated for recovery of zinc and solvent in zinc stripping and precipitation 15.

If so desired, the extract may be scrubbed with water in one or more stages prior to zinc stripping to remove most of the iron as ferrous chloride. The number of stages must be carefully selected to minimize zinc losses.

In zinc stripping and precipitation 15, the extract is treated with a sodium carbonate solution whereby the zinc precipitates in the aqueous phase as zinc carbonate, or zinc hydroxide, or both.

The sodium carbonate solution containing from about 0.1 to 1.0 molar sodium carbonate is prepared in carbonation step 16, wherein carbon dioxide is fed into a caustic-containing solution. A portion of the sodium chloride solution obtained from conversion 5 may contain sufficient unreacted caustic for this purpose.

The zinc-containing extract is thoroughly mixed with the sodium carbonate solution and settled for the separation in the solvent phase and the aqueous phase. The solvent phase is separated and returned to zinc extraction 14. The separated solvent may be treated with hydrochloric acid to regenerate the amine chloride which was decomposed during stripping. The aqueous phase, after separation from the solvent, is treated by liquid-solids separation. The solids, which may contain about 85% of the zinc originally present, form a zinc concentrate and the liquid, a sodium chloride solution, is returned to electrolysis step 7.

The extraction of zinc by solvent extraction and its subsequent stripping and precipitation is exemplified by the following example. A solution containing zinc and ferrous iron was thoroughly mixed with one l. of a solvent consisting of 194 g. tri-iso-octylamine in benzene at a temperature of 25° C. The pH of the mixture was less than 1.0. The mixture was settled and the extract and raffinate were separated. The extract was scrubbed in two stages to wash out ferrous chloride. The scrubbed extract was subsequently stripped of zinc with 0.83 l. of a 0.5 molar sodium carbonate solution. After settling the stripping raffinate was separated and the stripping extract, which contained precipitated zinc, was filtered. The solids were dried at 65° C. and analyzed. The dried solids contained 71.8% zinc and 4.9% iron (semi-quantitative analysis) for a zinc recovery of 87%. The volumes and zinc and iron contents of the various solutions are tabulated in Table IV.

Table IV

| Solution | Volume - l. | Zn - g/l | Fe - g/l |
|---|---|---|---|
| feed solution | 0.86 | 16.8 | 125.8 |
| raffinate | 0.96 | 0.3 | 109.0 |
| extract | 0.90 | — | — |
| 1st stage scrubbing solution | 0.24 | 2.3 | 8.0 |
| 2nd stage scrubbing solution | 0.24 | 4.5 | 2.6 |
| stripping raffinate | 0.36 | 0.01 | 0.03 |

The raffinate phase from zinc extraction 14 is treated with hydrogen sulphide gas for the precipitation of nickel and cobalt as sulphides in step 17. The precipitation is carried out at a temperature in the range of from about 100° to 150° C. and under a partial pressure of hydrogen sulphide of about 100 psi. After completion of the reaction, a concentrate of nickel and cobalt sulphide is recovered for further processing. The residual solution is fed to regeneration 8.

A portion of the residual solution is removed from the circuit for the purpose of bleeding alkali- and earth-alkali metals, especially Mg., in order to maintain the concentration of these metals in the circuit at acceptable levels. The bleed solution may be treated in a pickle-liquor furnace for recovery of chlorine values.

The major portion of the chlorine obtained in brine electrolysis 7 is absorbed in a small portion of leach solution from leach 1 in chlorine absorption 18. The solution containing the absorbed chlorine is returned to leach 1. A minor portion of the chlorine is used in gold recovery 10.

What I claim as new and desire to protect by Letters Patent of the United States is:

1. A process for the recovery of non-ferrous, ferrous and precious metal values and sulphur from concentrates containing metal sulphides which comprises the steps of:
   (1) subjecting said concentrates to a leach at a temperature in the range of about 80° to 110° C under autogenous pressure with lixiviant containing ferric chloride, cupric chloride and chlorine to form a leach solution containing cuprous chloride and a leach residue;
   (2) treating said leach solution with gaseous butadiene at a temperature in the range of about −35° to +40° C under autogenous pressure to form a precipitate of cuprous chloride-butadiene addition compound and residual solution;
   (3) decomposing precipitated addition compound at a temperature of up to about 80° C. at atmospheric pressure for the separate recovery of cuprous chloride and butadiene;
   (4) returning recovered butadiene to step (2);
   (5) slurrying recovered cuprous chloride and treating the slurry with an oxygen-bearing gas at a pressure in the range of about atmospheric to 250 psi and at a temperature in the range of about 50° to 150° C to form a precipitate of cupric oxychloride and a solution containing cupric chloride;
   (6) returning solution containing cupric chloride to step (1);
   (7) electrolyzing brine solution for formation of sodium hydroxide solution, hydrogen gas and chlorine gas;
   (8) converting precipitated cupric oxychloride to cupric oxide and brine solution with an approximately stoichiometric amount of formed sodium hydroxide solution at a temperature in the range of about 80° C to the boiling point of the reaction mixture, under autogenous pressure, to give a final pH in the range of 7 to 11;
   (9) returning brine solution to step (7);
   (10) reducing cupric oxide to metallic copper with formed hydrogen gas;
   (11) passing formed chlorine gas to step (1);
   (12) treating residual solution from step (2) with an oxygen-bearing gas at a partial pressure of oxygen in the range of from about 100 to 200 psi and at a temperature in the range of from about 135° to 165° C for the regeneration of ferric-chloride and the simultaneous precipitation of anhydrous ferric oxide; and
   (13) returning regenerated ferric chloride to step (1).

2. A process as claimed in claim 1 wherein the leach is conducted at a temperature in the range of from about 95° C to the boiling point at atmospheric pressure and wherein the chlorine gas of the lixiviant is added separately from the ferric chloride and cupric chloride about one hour after commencement of the leach.

3. A process as claimed in claim 1, wherein the leach solution is treated with gaseous butadiene at a temperature in the range of from about −5° to +25° C. under autogenous pressure and wherein the residual solution contains about 5 g/l copper.

4. A process as claimed in claim 1, wherein the decomposition of addition compound is carried out at a temperature in the range of from about 40° to 65° C. and at a pressure in the range of from about 0.01 to 0.9 atmosphere absolute.

5. A process as claimed in claim 1, wherein the slurry of recovered cuprous chloride is treated with an oxygen-bearing gas at a partial pressure of oxygen in the range of from about 40 to 100 psi and at a temperature in the range of from about 100° to 150° C.

6. A process as claimed in claim 1, wherein the slurry of recovered cuprous chloride is treated with an oxygen-bearing gas in the presence of previously obtained precipitate.

7. A process as claimed in claim 1 wherein the leach is conducted at a temperature in the range of from about 95° C to the boiling point at atmospheric pressure and the chlorine gas of the lixiviant is added separately from the ferric chloride and cupric chloride about one hour after commencement of the leach, the leach solution is treated with metallic copper at a temperature in the range of from about 80° C to the boiling point of the solution whereby at least a portion of the cupric chloride is reduced to cuprous chloride, the leach solution is treated with gaseous butadiene at a temperature in the range of from about −5° to +25° C under autogenous pressure and the residual solution contains about 5 g/l copper, the decomposition of addition compound is carried out at a temperature in the range of from about 40° to 65° C and at a pressure in the range of from about 0.01 to 0.9 atmosphere absolute, the slurry of recovered cuprous chloride is treated with an oxygen-bearing gas at a partial pressure of oxygen in the range of from about 40 to 100 psi and at a temperature in the range of from about 100° to 150° C, the leach residue is desulphurized for the recovery of at least a major portion of the elemental sulphur present in said residue, gold is dissolved from an at least partly desulphurized leach residue by adding ferric chloride solution having about 50 to 200 g/l iron as ferric chloride to gold-containing leach residue to form a reaction mixture which contains leach residue solids in an amount of about 150 to 200 g/l, adding chlorine gas to the ferric chloride solution added to the leach residue in a weight ratio to dissolved gold of about 1:1 to 1:6, maintaining the reaction mixture at a temperature in the range of about 50° to 90° C for a period of about 2 to 24 hours, maintaining the oxidation potential of the reaction mixture during the leach in the range of from about 560 – 900 mv. measured with a saturated calomel electrode, separating solution containing dissolved gold from residual solids, and recovering gold from said solution, at least a portion of chlorine gas returned to step (1) is absorbed in a portion of the leach solution, the residual solution from step (2) and solution containing cupric chloride from step (5) are treated for the recovery of silver as silver iodide by adding cuprous iodide to said solution in an amount of from about 2 to 5 times the stoichiometric amount of cuprous iodide required for precipitation of silver as silver iodide, maintaining a temperature in the range of from about 10° to 25° C for a period of time of about 10 to 120 minutes and recovering silver iodide from the solution, a portion of residual solution after recovery of silver contained in said residual solution is treated with iron for the cementation of copper to obtain a substantially copper-free iron-containing solution and cement copper, the quantity of said portion of residual solution treated is determined by the amount of zinc, nickel and cobalt in the concentrates, said zinc, cobalt and nickel are recovered from the copper-free iron-containing solution and, at least a portion of final residual solution is recycled to regeneration step (12) of claim 1.

8. A process as claimed in claim 1 wherein the leach residue is desulphurized for the recovery of at least a major portion of the elemental sulphur present in said residue.

9. A process as claimed in claim 8 wherein gold is dissolved from an at least partly desulphurized leach residue by:
(1) adding ferric chloride solution having about 50 to 200 g/l iron as ferric chloride to gold containing leach residue to form a reaction mixture which contains leach residue solids in an amount of about 150 to 500 g/l;
(2) adding chlorine gas;
(3) maintaining the reaction mixture at a temperature in the range of about 50° to 90° C for a period of about 2 to 24 hours;
(4) maintaining the oxidation potential of the reaction mixture during the leach in the range of from about 550 – 930 mv. measured with a saturated calomel electrode;
(5) separating solution containing dissolved gold from residual solids; and
(6) recovering gold from said solution.

10. A process as claimed in claim 9, wherein an oxidation potential of the reaction mixture is maintained during the leach in the range of from about 560 to 900 mv. measured with a saturated calomel electrode.

11. A process as claimed in claim 9, wherein the amount of chlorine to dissolved gold is maintained at a weight ratio of from about 1:1 to 1:6.

12. A process as claimed in claim 9, wherein the chlorine gas is added to the ferric chloride solution added to the leach residue.

13. A process as claimed in claim 9, wherein the reaction mixture contains leach residue solids in an amount of from about 150 to 200 g/l.

14. A process as claimed in claim 1, wherein at least a portion of chlorine gas returned to step (1) is absorbed in a portion of the leach solution.

15. A process as claimed in claim 1 wherein the residual solution from step (2) and solution containing cupric chloride from step (5) are treated for the recovery of silver as silver iodide by adding cuprous iodide to said solution in an amount of from about 2 to 10 times the stoichiometric amount of cuprous iodide required for precipitation of silver as silver iodide, maintaining a temperature in the range of from about 10° to 70° C. and recovering silver iodide from the solution.

16. A process as claimed in claim 15 wherein about 2 to 5 times the stoichiometric amount of cuprous iodide required for precipitating silver as silver iodide is added and wherein a temperature in the range of from about 10° to 25° C. is maintained for a period of time of from about 10 to 120 minutes.

17. A process as claimed in claim 15 wherein at least a portion of residual solution from step (2) after recovery of silver contained in said residual solution is treated with iron for the cementation of copper to obtain a substantially copper-free iron-containing solution and cement copper, and said copper free iron-containing solution is treated for recovery of zinc by extraction with a tertiary amine solvent.

18. A process as claimed in claim 17 wherein the solvent extraction is carried out by mixing copper-free solution with tri-iso-octyl amine diluted with benzene in a concentration of from about 0.1 to 0.6 molar of said amine in benzene in multi-stage counter- or cross-current fashion at a temperature of from about ambient temperature to about 30° C and at a pH in the range of from about 0.5 to 1.5 whereby a substantially zinc-free raffinate and a zinc-containing extract are obtained, the zinc-containing extract is scrubbed with water in one or more stages to remove most of contained iron as ferrous chloride, and the zinc-containing extract is treated with a solution containing from about 0.1 to 1.0 molar sodium carbonate for the precipitation and recovery of zinc and the recovery of solvent.

19. A process as claimed in claim 18 wherein the raffinate is treated with hydrogen sulphide gas at a temperature in the range of from about 100° to 150° C and under a partial pressure of hydrogen sulphide of about 100 psi for the precipitation and recovery of nickel and cobalt as sulphides from a residual solution, and said residual solution is recycled to step (12) for regeneration of ferric chloride and simultaneous precipitation of anhydrous ferric oxide.

* * * * *